(12) United States Patent
Kolavennu et al.

(10) Patent No.: US 7,826,373 B2
(45) Date of Patent: *Nov. 2, 2010

(54) WIRELESS ROUTING SYSTEMS AND METHODS

(75) Inventors: Soumitri N. Kolavennu, Minneapolis, MN (US); Dharmashankar Subramanian, New Hope, MN (US); Anoop Mathur, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 880 days.

This patent is subject to a terminal disclaimer.

(21) Appl. No.: 10/905,971

(22) Filed: Jan. 28, 2005

(65) Prior Publication Data

US 2006/0171346 A1 Aug. 3, 2006

(51) Int. Cl.
  *H04L 12/12* (2006.01)
(52) U.S. Cl. .................. 370/238; 370/252; 370/254; 370/328
(58) Field of Classification Search .......... 370/252, 370/253, 254–258, 237–238, 351, 208, 328
  See application file for complete search history.

(56) References Cited

U.S. PATENT DOCUMENTS

| | | |
|---|---|---|
| 3,643,183 A | 2/1972 | Geffe |
| 3,715,693 A | 2/1973 | Fletcher et al. |
| 3,758,885 A | 9/1973 | Voorman et al. |
| 4,264,874 A | 4/1981 | Young |
| 4,529,947 A | 7/1985 | Biard et al. |
| 4,614,945 A | 9/1986 | Brunius et al. |
| 4,812,785 A | 3/1989 | Pauker |
| 4,843,638 A | 6/1989 | Walters |
| 5,392,003 A | 2/1995 | Nag et al. |
| 5,428,602 A | 6/1995 | Kemppainen |
| 5,428,637 A | 6/1995 | Oliva, Jr. et al. |
| 5,430,409 A | 7/1995 | Buck et al. |
| 5,438,329 A | 8/1995 | Gastouniotis et al. |
| 5,451,898 A | 9/1995 | Johnson |
| 5,481,259 A | 1/1996 | Bane |
| 5,642,071 A | 6/1997 | Sevenhans et al. |
| 5,659,303 A | 8/1997 | Adair, Jr. |
| 5,726,603 A | 3/1998 | Chawla et al. |

(Continued)

FOREIGN PATENT DOCUMENTS

CH 673184 2/1990

(Continued)

OTHER PUBLICATIONS

"Medium Access Control (MAC) and Physical (PHY) Specifications," ANSI/IEEE Std 802.11, pp. 177-179, 1999.

(Continued)

*Primary Examiner*—Ricky Ngo
*Assistant Examiner*—Ben H Liu
(74) *Attorney, Agent, or Firm*—Crompton Seager & Tufte LLC

(57) ABSTRACT

Wireless communications methods and systems. Metrics for measuring performance of a wireless system are generated and compared to metrics generated with an idealized simulation of the system. If the actual system performance falls below a predetermined level, the system may be reconfigured to improve performance using a centralized or decentralized method for such configuration.

21 Claims, 3 Drawing Sheets

U.S. PATENT DOCUMENTS

| | | | |
|---|---|---|---|
| 5,767,664 | A | 6/1998 | Price |
| 5,809,013 | A | 9/1998 | Kackman |
| 5,847,623 | A | 12/1998 | Hadjichristos |
| 5,963,650 | A | 10/1999 | Simionescu et al. |
| 5,987,011 | A * | 11/1999 | Toh .............. 370/331 |
| 6,026,303 | A * | 2/2000 | Minamisawa .............. 455/446 |
| 6,052,600 | A | 4/2000 | Fette et al. |
| 6,058,137 | A | 5/2000 | Partyka |
| 6,091,715 | A | 7/2000 | Vucetic et al. |
| 6,175,860 | B1 | 1/2001 | Gaucher |
| 6,236,642 | B1 * | 5/2001 | Shaffer et al. .............. 370/237 |
| 6,353,846 | B1 | 3/2002 | Fleeson |
| 6,366,622 | B1 | 4/2002 | Brown et al. |
| 6,401,129 | B1 | 6/2002 | Lenander |
| 6,414,955 | B1 * | 7/2002 | Clare et al. ................ 370/390 |
| 6,414,963 | B1 | 7/2002 | Gemar |
| 6,624,750 | B1 | 9/2003 | Marman et al. |
| 6,768,901 | B1 | 7/2004 | Osborn et al. |
| 6,785,255 | B2 | 8/2004 | Sastri et al. |
| 6,823,181 | B1 | 11/2004 | Kohno et al. |
| 6,836,506 | B2 | 12/2004 | Anderson |
| 6,901,066 | B1 * | 5/2005 | Helgeson ................. 370/348 |
| 6,944,121 | B1 * | 9/2005 | Weste et al. ................ 370/208 |
| 7,020,501 | B1 * | 3/2006 | Elliott et al. .............. 455/574 |
| 7,072,304 | B2 * | 7/2006 | Ng et al. .................... 370/238 |
| 7,164,651 | B2 * | 1/2007 | Weste et al. ................ 370/208 |
| 7,242,294 | B2 * | 7/2007 | Warrior et al. ......... 340/539.22 |
| 7,522,537 | B2 * | 4/2009 | Joshi ......................... 370/254 |
| 2002/0011923 | A1 | 1/2002 | Cunningham et al. |
| 2002/0071413 | A1 * | 6/2002 | Choi ......................... 370/337 |
| 2002/0085622 | A1 | 7/2002 | Dhar et al. |
| 2002/0141479 | A1 | 10/2002 | Garcia-Luna-Aceves et al. |
| 2003/0002446 | A1 * | 1/2003 | Komaili et al. .............. 370/252 |
| 2003/0053555 | A1 | 3/2003 | McCorkle et al. |
| 2003/0063585 | A1 | 4/2003 | Younis et al. |
| 2003/0151513 | A1 | 8/2003 | Herrmann et al. |
| 2003/0198280 | A1 | 10/2003 | Wang et al. |
| 2004/0028023 | A1 * | 2/2004 | Mandhyan et al. .......... 370/351 |
| 2004/0029553 | A1 * | 2/2004 | Cain ......................... 455/403 |
| 2004/0157557 | A1 * | 8/2004 | Barnett et al. .............. 455/41.2 |
| 2004/0230638 | A1 * | 11/2004 | Balachandran et al. ...... 709/200 |
| 2004/0233882 | A1 * | 11/2004 | Park et al. .................... 370/338 |
| 2004/0253996 | A1 | 12/2004 | Chen et al. |
| 2004/0264466 | A1 * | 12/2004 | Huang ......................... 370/392 |
| 2005/0041591 | A1 * | 2/2005 | Duggi et al. ................. 370/238 |
| 2005/0053007 | A1 * | 3/2005 | Bernhardt et al. ........... 370/238 |
| 2005/0054346 | A1 * | 3/2005 | Windham et al. ........... 455/445 |
| 2005/0157697 | A1 * | 7/2005 | Lee et al. .................... 370/349 |
| 2005/0157698 | A1 * | 7/2005 | Park et al. .................... 370/351 |
| 2005/0281215 | A1 | 12/2005 | Budampati et al. |
| 2006/0104205 | A1 * | 5/2006 | Strutt et al. .................. 370/238 |
| 2006/0153089 | A1 * | 7/2006 | Silverman .................... 370/252 |
| 2007/0077927 | A1 * | 4/2007 | Zhao et al. .............. 455/435.2 |

FOREIGN PATENT DOCUMENTS

| | | |
|---|---|---|
| DE | 4344172 | 6/1995 |
| EP | 0607562 | 7/1994 |
| EP | 0893931 | 1/1999 |
| WO | WO 00/70572 | 11/2000 |

OTHER PUBLICATIONS

"Product Specification for Advanced Pager Receiver UAA2082", Philips, Integrated Circuits, 41 pages, Jan. 15, 1996.
"ZigBee Wireless Networking Software," EmberNet ZigBee, 2 pages, prior to Jun. 17, 2005.
Abidi, "Direct-Conversion Radio Transceivers for Digital Communications," IEEE Journal of Solid-State Circuits, vol. 30, No. 12, pp. 1399-1410, Dec. 1995.
Abidi, "Upconversion and Downconversion Mixers for CMOS Wireless Transceivers," copyright AAA, 42 pages, 1996.
Chang et al., "A CMOS Channel-Select Filter for a Direct-Conversion Wireless Receiver," IEEE Journal of Solid-State Circuits, vol. 32, No. 5, pp. 722-729, May 1997.
Cheng et al., "TPS: A Time-Based Positioning Scheme for Outdoor Wireless Sensor Networks," IEEE INFOCOM 2004, 12 pages, 2004.
Craig, "Zigbee: Wireless Control That Simply Works," 7 pages, prior to Jun. 17, 2005.
Crols et al., "CMOS Wireless Transceiver Design," Kluwer Academic Publishers, 22 pages, 1997.
http://wiki.personaltelco.net/index.cgi/PhasedArray?action=print, "Phased Array—Personal Telco Wiki," 3 pages, May 2, 2005.
http://www.bambooweb.com/articles/o/s/OSI_model.html, "Bambooweb OSI model," Bambooweb Dictionary, 5 pages, printed May 23, 2005.
http://www.dailywireless.org/modules.php?name=News &file=article&sid=871, "Location By Triangulation—Not," Daily Wireless, 2 pages, printed May 2, 2005.
http://www.unstrung.com/document.asp?site=unstrung&doc_id 15069&page_number=1, 11 pages, printed May 2, 2005.
http://www.zigbee.org/en/about/faq.asp, "Wireless Control That Simply Works," ZigBee Alliance, 8 pages, printed Feb. 2, 2005.
Jung et al., "Improving IEEE 802.11 Power Saving Mechanism," 6 pages, Jul. 7, 2004.
Kinney, "ZigBee Technology: Wireless Control That Simply Works," 20 pages, Oct. 2, 2003.
Lee, "The Design of CMOS Radio-Frequency Integrated Circuits," Cambridge University Press, 42 pages, 1998.
Milstein, "Wideband Code Division Multiple Access," IEEE Journal on Selected Areas in Communications, vol. 18, No. 8, pp. 1344-1354, Aug. 2000.
Moulding et al., "Gyrator Video Filter IC with Automatic Tuning," IEEE Journal of Solid-State Circuits, vol. SC15, No. 6, Dec. 1980, pp. 963-968.
Nasipuri et al., "A Directionality Based Location Discovery Scheme for Wireless Sensor Networks," pp. 105-111, prior to Jun. 17, 2005.
Razavi, "Design Considerations for Direct-Conversion Receivers," IEEE Transactions on Circuits and Systems—II: Analog and Digital Signal Processing, vol. 44, No. 6, pp. 428-435, Jun. 1997.
Rofougaran et al., "A 1 GHz CMOS RF Front-End IC for a Direct-Conversion Wireless Receiver," IEEE Journal of Solid-State Circuits, vol. 31, pp. 880-889, Jul. 1996.
Rofougaran et al., "A 900 MHz CMOS RF Power Amplifier with Programmable Output Power," Proceedings VLSI Circuits Symposium, Honolulu, 4 pages, Jun. 1994.
Savvides et al., "Dynamic Fine-Grained Localization in Ad-Hoc Networks of Sensors," pp. 166-179, prior to Jun. 17, 2005.
Want et al. "The Active Badge Location System," 7 pages, prior to Jun. 17, 2005.
Wilson et al., "A Single-Chip VHF and UHF Receiver for Radio Paging", IEEE Journal of Solid State Circuits, vol. 26, No. 12, 9 pp. 1944-1950, Dec. 1991.

* cited by examiner

WIRELESS ROUTING SYSTEMS AND METHODS

FIELD

The present invention is related to the field of wireless communication. More specifically, the present invention relates to methods of configuring communication routes between wireless devices.

BACKGROUND

Wireless communication systems make use of routing protocols to move information from a first device to a second device. For such systems, there are often one or more base stations (various terms are used, including root node or gateway) that connect the wireless communication system to a second communication system. One example is an access point acting as the intermediary between a wireless system and a wired system. The other devices in the wireless system must determine how to route data to reach the base node.

Because the reliable transmission range of a device may not include the base node, routing strategies will often make use of intermediate devices. For example, as shown in FIG. 1, device X has a communication range RX, device Y has a communication range RY, and the base device B has a communication range RB. If only these three devices are included in the wireless network, the solution is simple: when X has data to send to B, X will send the data to Y, and Y will send the data to B. As more devices are added, however, the routing solutions become more complex.

SUMMARY

The present invention, in an illustrative embodiment, comprises a method of analyzing performance of a wireless communication system, the wireless communication system including a base station and a number of node devices, the method comprising observing link characteristics of device pairs in the system, generating a centralized communication solution using the link characteristics, calculating a first quality metric using the centralized communication solution, observing an actual communication configuration for the node devices and generating a second quality metric, and comparing the first quality metric to the second quality metric.

In another embodiment, the centralized communication solution is characterized in that, for each node device, first and second (or more) non-overlapping communication routes to the base station are defined. For another illustrative embodiment, the actual communication configuration also defines first and second (or more) non-overlapping communication routes to the base station for each node device, at least some defined communication routes including intermediate nodes between the node device and the base station. The first and second quality metrics may include a component related to a sum of latencies introduced by each intermediate node in at least some defined communication routes.

In yet another embodiment, the first and second quality metrics include a component related to a number of hops between a first node device and the base station. Also, the first and second quality metrics may include a component related to the link quality of a link used in a route defined between a first node device and the base station. In another illustrative embodiment, the centralized communication solution and the actual communication configuration define communication routes having intermediate nodes through which communications pass between a first node device and the base station, wherein the first and second quality metrics include a component related to the number of overlapping routes occurring at an intermediate node. The method may also include, if the step of comparing indicates system inefficiency beyond a predefined level, reconfiguring the system.

Another illustrative embodiment includes a wireless communication system comprising at least one base station and a number of node devices configured for wireless communication with one another, wherein at least one analyzing device in or communicatively coupled to the system is configured to gather data related to actual communication routes defined in the system and observe an actual quality metric of the system communication status, and wherein the analyzing device is further configured to generate a mathematically optimum quality metric for comparison to the actual quality metric.

In another embodiment, for each node device, first and second non-overlapping communication routes to the base station are defined when the mathematically optimum quality metric is generated. In yet another embodiment, the actual communication configuration defines first and second non-overlapping communication routes to the base station for each node device, at least some defined communication routes including intermediate nodes between the node device and the base station. Also, the actual and optimum quality metrics may include a component related to a sum of latencies introduced by each intermediate node in at least some defined communication routes.

In another embodiment, the actual and optimum quality metrics include a component related to a number of hops between a first node device and the base station. In yet another illustrative embodiment, the actual and optimum quality metrics include a component related to the link quality of a link used in a route defined between a first node device and the base station. Also, a number of optimal communication routes may be defined when the mathematically optimal metric is generated, at least one optimal communication route having an intermediate node conveying data from a first node to the base station, at least one actual communication route may include an intermediate node, and, the actual and optimum quality metrics may include a component related to the number of overlapping routes occurring at an intermediate node. In yet another embodiment, the system is configured to have a first routing protocol for routing data through the system to a base station, and, if a comparison of the mathematically optimum metric to the actual metric indicates system inefficiency beyond a predetermined level, a new routing protocol is generated to replace the first routing protocol.

In an illustrative embodiment, the present invention includes a wireless communication system comprising at least one base station, a number of infrastructure node devices configured for wireless communication with one another, and a number of leaf devices that communicate with the infrastructure node devices; wherein at least one analyzing device in or communicatively coupled to the system is configured to gather data related to actual communication routes defined in the system and observe an actual quality metric of the system communication status, and wherein the analyzing device is further configured to generate a mathematically optimum quality metric for comparison to the actual quality metric.

In yet another embodiment, the leaf devices comprise sensors having a sleep mode and an active mode, the sensors adapted to awaken at scheduled times and transmit data to infrastructure node devices, each sensor being associated with at least two infrastructure node devices. In another illustrative embodiment, the system is configured such that first and second non-overlapping routes are defined from each leaf node to a base station. Also, the system may be configured to have a first routing protocol for routing data through the system to a base station, and, if a comparison of the mathematically optimum metric to the actual metric indicates system inefficiency beyond a predetermined level, a new routing protocol may be generated to replace the first routing protocol.

DETAILED DESCRIPTION

The following detailed description should be read with reference to the drawings. The drawings, which are not necessarily to scale, depict illustrative embodiments and are not intended to limit the scope of the invention.

In an illustrative embodiment, the present invention is directed to a wireless network having a number of devices. Poor data routing can increase the response time of such networks, and makes such networks vulnerable to over-reliance on a limited number of devices. For example, if data is routed heavily through one or two nodes, then these nodes form a bottleneck for flow of information from source nodes to the base station leading to delays. Furthermore, failure of those heavily used nodes can lead to heavy data losses.

Design and selection of data routing within such networks is rendered complicated due to their distributed nature, even when the data routing takes place within a network having a number of static (non-moving) devices. At any given time, one or more devices that are a part of the network may, for whatever reason, be out of communication with the rest of the network. For example, a flurry of local noise can block communication with a device, or a device may periodically enter a low power sleep mode. Further, it is often desirable to have a network enabled for adding devices after initial setup.

One result of these various difficulties is that centralized configuration of data routing is rendered laborious. For example, a centralized configuration may require updating when a device is permanently or temporarily added or removed. Updating a centralized configuration may require contacting each device in the network separately. These difficulties make decentralized configuration a desirable feature during ongoing operation. However, it has been found in simulation that decentralized configuration often fails to produce results that are as optimal as centralized configuration. The present invention, in an illustrative embodiment, is directed at improving wireless communication system configurations by aiding in the assessment of operating configurations.

Figure 1:
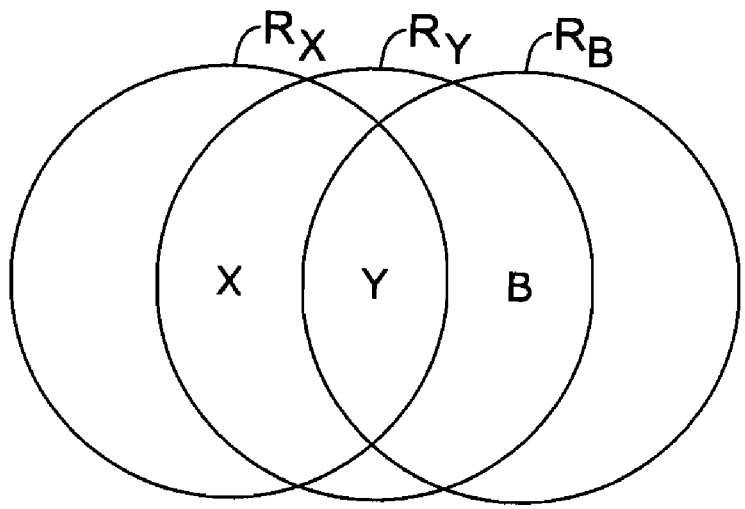
FIG. 1 is a diagram of a wireless network showing communication range.
Figure 2:
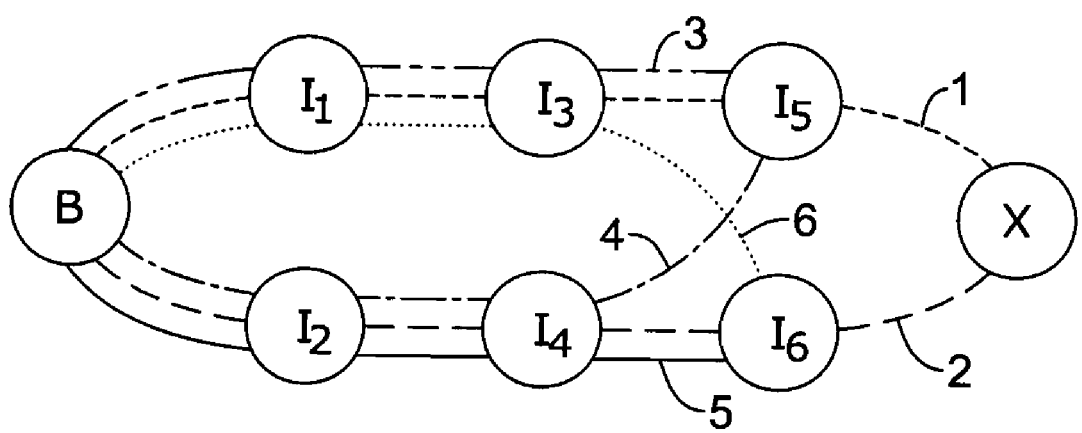
FIG. 2 is a diagram of redundant, non-overlapping routes in a wireless network.

FIG. 2 is a diagram of redundant, non-overlapping routes in a wireless network. The network is shown including a base station B, and several nodes I1 . . . I6 and X. In the illustrative embodiment, the aim is to provide robust communication between X and B. Defining non-overlapping redundant routes is one way of achieving such a goal. A first route 1 is defined between X and B, going through the odd-numbered nodes I5, I3, and I1. A second route 2 is defined between X and B, going through the even-numbered nodes I6, I4, and I2. The two routes 1, 2 do not overlap, and are therefore redundant, non-overlapping routes.

Also shown are additional routes to create redundancy from node I5 to B. A first route follows route 1 and is denoted route 3, and another route for I5 follows route 4, through nodes I4 and I2. Likewise for node I6, route 5 follows part of route 2, and route 6 goes through nodes I3 and I1. As can be seen, even with relatively few nodes or devices, the number of paths grows quickly, especially when non-overlapping redundant paths are desired. In some embodiments, device X is a device operating in similar fashion to the other node devices I1 . . . I6. In other embodiments, for example as further illustrated below in FIG. 5, device X may instead be a different type of device than the node devices.

Figure 3:
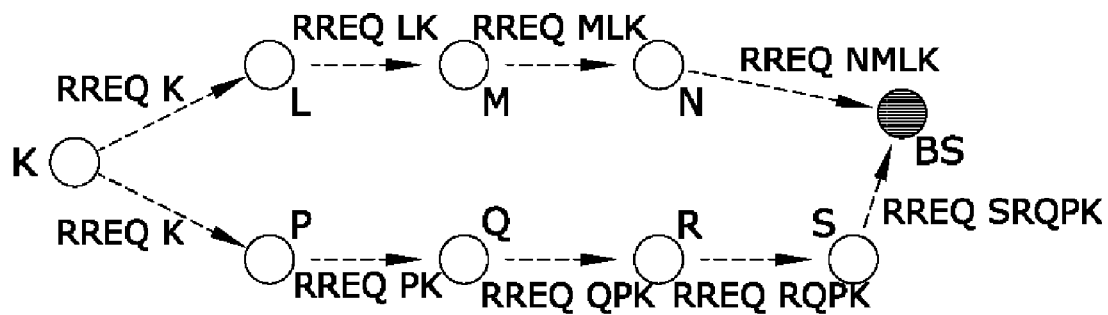
FIG. 3 is a diagram illustrating decentralized configuration of routes for a device A.

FIG. 3 is a diagram illustrating decentralized configuration of routes for a device K. In the illustrative embodiment, K may be a newly added device to a system already having other devices L, M, N, P, Q, R, S, and base station BS. Device K may instead be a device which was part of they system, but which is reestablishing contact with the system, for example, after a low power sleep period or after a period of interference (noise) preventing contact. Device K may also be reconfiguring itself in light of a command to reconfigure routing, for example, after other devices have been added to the system.

Decentralized configuration to add K may take place as follows. K generates a routing request RREQ, followed by its own address, K, making message "RREQK". When nearby devices L, P receive the routing request from K, each will retransmit the message, after including its own address in the message. Other information, for example, RSSI data (received signal strength indicator), other link quality data, or node latency data (in the illustrative embodiment, the node latency is proportional to the number of routes serviced by the node) may also be added. Node latency data may take any suitable form. In another example, node latency data may be generated by having several or each node maintain statistics on the residence time of data (or packets of data) at that node. In a further example, the latency value for each node may be the mean residence time, or statistics related to the set or distribution of residence times as the latency value. To accommodate for intermittent communication failures that may occur, for example, where a device is not always "ON" (i.e. occasionally enters sleep mode), the gathered data may include indicators of communication link failures and the frequency of such failures.

The message is then repeated until the RREQ reaches the destination, in this case, the base station BS. As shown, the base station may receive more than one RREQ from K—in this case, RREQNMLK passes through nodes L, M, and N after it is generated by K and before it is received at BS. Likewise, RREQSRQPK passes through nodes P, Q, R, and S after it is generated and before it is received at BS. The base station BS will then sort through the messages and select the apparently best route. Typically, the "best" route will be determined as the one having the best link strength and fewest number of hops. Other factors that may be considered in having the base station select the best route include the "load" of any of the intermediate nodes between K and BS. For example, a route including a high load intermediate node (a node that already forms a part of a large number of other existing routes) may be deselected to avoid data collisions at the high load node.

After BS selects the optimal route (or two or more best optimal routes, in some embodiments), a message is generated by BS and addressed to K for the purpose of indicating, to K, what route(s) should be used. In some embodiments, the base station BS is enabled for broadcasting to all other nodes, such that the message can be sent by BS directly to K. In other embodiments, BS may route the message to K using intermediate devices. The decentralized configuration can typically be performed without significantly interfering with communications within the network. However, because devices such as device K can be added, activated, reactivated, or otherwise configured in a random order, the decentralized configuration routine often achieves a result that diverges from an optimum possible configuration. However, repeated reconfiguration using a centralized configuration routine becomes complex and therefore can be costly in terms of computational needs and downtime for updating configurations. Therefore the present invention provides a benchmark for determining how far from optimal an actual configuration is, to determine whether reconfiguration or other remedy is in order.

It can be seen in FIG. 3 that two non-overlapping, redundant paths have been defined for K to reach the base station BS. One path follows the series K-L-M-N-BS. The other path follows the series K-P-Q-R-S-BS. These paths have different lengths, often described as having different numbers of hops. The maximum load carried by any one of the intermediate stations (L, M, and N in one instance, P, Q, R, and S in the other) may be different from one route to the next. Each link in the path may have a different signal strength. Also, each node in the path may carry a different load insofar as the number of routes passing therethrough is concerned. Each of these factors can affect system performance, for example, by changing the amount of time needed for data to reach BS, or how a route affects other routes used in the system.

Figure 4:
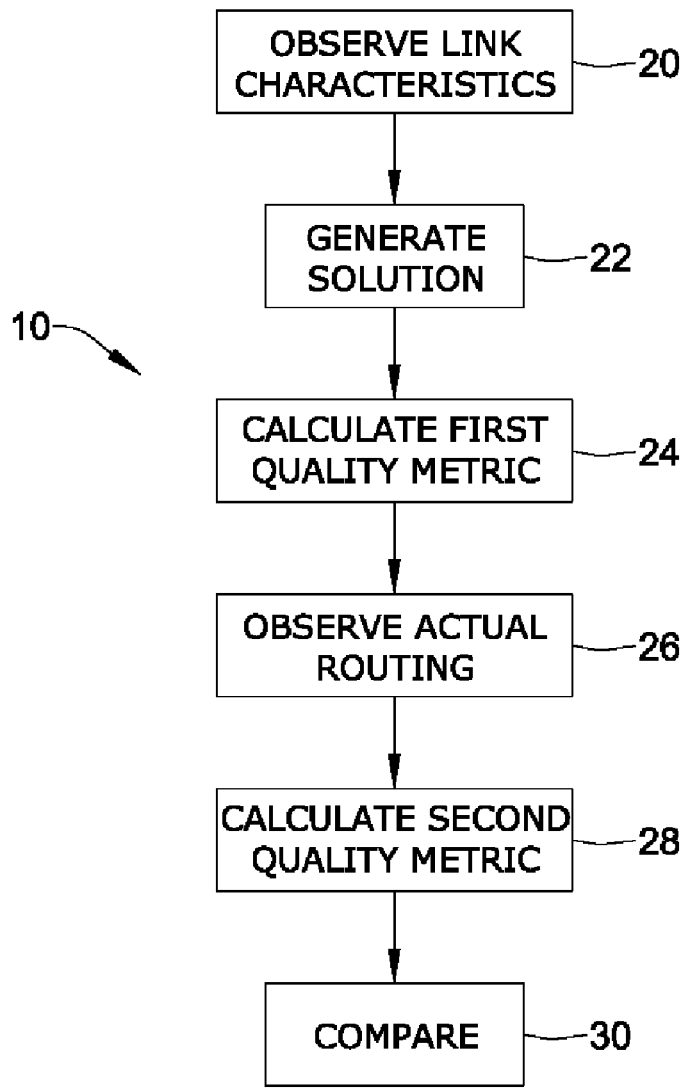
FIG. 4 is a flow chart for an illustrative embodiment.

FIG. 4 is a flow chart for an illustrative embodiment. The method 10 begins by observing link characteristics among links in an existing wireless system, as shown at 20. The existing system may be, for example, one in which at least some nodes have been added and provided communications routes in a decentralized manner. In another step, an optimal solution is generated, as shown at 22.

In an illustrative embodiment, the optimal solution is generated by a process of a mixed integer linear program. First, two redundant, non-overlapping paths are defined for each node, as illustrated above in FIGS. 2 and 3. The mixed integer linear program then runs to minimize the sum of the following:

+$\alpha 1$*{Sum of the number of hops over the two redundant paths of each node to base};

−$\alpha 2$*{Sum of the logarithms of the link quality of each link over all links in the two paths for each node};

+$\alpha 3$*{Maximum Load serviced by any node in the network};

+$\alpha 4$*{Sum of the latencies introduced by each intermediate node in a path, over the two paths of each node}.

For the illustrative embodiment, the latency introduced by an intermediate node may be proportional to the number of routes serviced by the node. Node latency may also be calculated using additional metrics including the residence time of data at a particular node, for example, by calculating a mean residence time or statistics related to a number of residence times for data passing through a particular node at various times. The variables $\alpha 1 \ldots \alpha 4$ can be set by a user depending on which of the identified factors is considered most important. If desired, rather than the four values noted above, other system variables may be used. For example, rather than using the maximum load satisfied by any node in the network, the statistical variance of node loads may by used. Similarly, the statistical mean of the distribution of the queuing delays (or residence times) of a packet at a node may be used for latency measures.

In the illustrative embodiment, the above set of factors, including the $\alpha$ variables, are then used to generate a first quality metric, as shown in FIG. 4 at step 24. This metric may be, for example, a number. Next, the actual routing characteristics of the system are observed, as shown at 26. A second quality metric is generated as shown at 28, making use of the routing characteristics, as used in the above formulas with the same set of $\alpha$ variables. Finally, the first and second quality metrics are compared, as shown at step 30. For the system, reconfiguration may take place when the comparison of the first and second quality metrics indicates a need for reconfiguration. For example, if the first quality metric is less than a preselected percentage (for example, 75%, or any other value) of the second quality metric, an improvement of 25% as a result of reconfiguration may be expected from reconfiguration, such that the computational and communication expense required for implementing reconfiguration is justified.

In an illustrative embodiment, physical information related to the infrastructure nodes are characterized in terms of their physical characteristics, including relative juxtaposition and link strength between nodes. A graph is defined G (V, E) in which the vertex set is the set of all nodes, including the base station. The edges of the graph are directed edges that denote communication connectivity between vertices. For example, if there is a directed edge between a vertex A and a vertex B, then there is communication possible from A to B. Then the two (or more) best non-overlapping paths to the base station are chosen. By using a graphical analysis taking into consideration the factors noted above, an optimal solution may be approached.

In some embodiments, less than all of the above noted factors are considered for the minimization process. Alternatively, one or more of $\alpha 1 \ldots \alpha 4$ may be set to zero such that one or more factors are eliminated.

Using the above formula and a wireless network simulator, various trials were performed. It was found that a decentralized approach, when used in the wireless network simulator, was not as good as an approach using a centralized approach to designing the global system. For example, taking into account only the first factor (number of hops), a centralized approach is typically in the range of 7-10% better (i.e. 7-10% less hops) than a decentralized approach. However, as noted above, complete reliance on a centralized approach may create other difficulties limiting its utility.

Within the context of the present invention, a centralized approach to routing can be considered an optimized approach. Because there are several factors involved in creating the "optimum" approach, it should be understood that there is, in reality, rarely a single "ioptimal" routing approach. There are, instead, optimized communication solutions which may be optimized in terms of one or more factors determining communication quality. A centralized solution is one category of optimized solutions. Within the set of centralized solutions are solutions optimized for various factors. The illustrative embodiments herein provide examples including optimized communication solutions that may be centralized solutions optimized to reduce the number of communications hops used, the system latency, and/or the maximum load satisfied by any node in the system, and/or maximizing link quality within a network.

Figure 5:
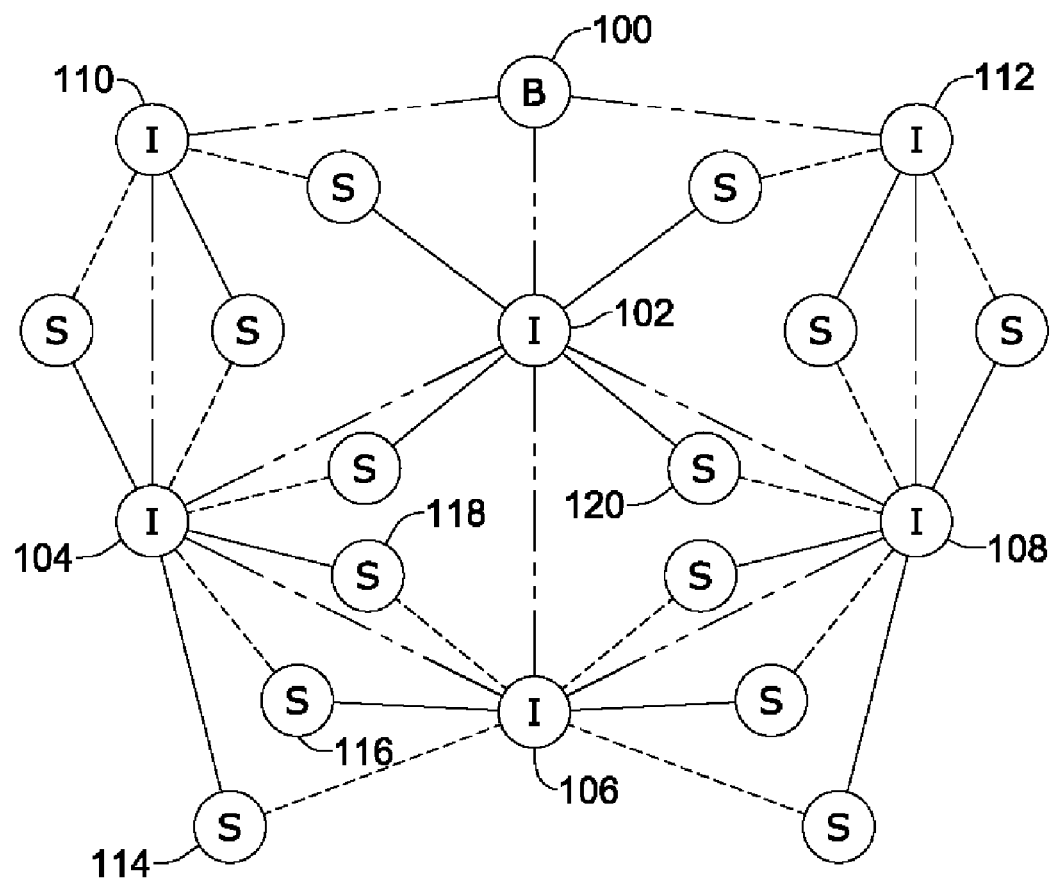
FIG. 5 illustrates an example wireless sensor network.

FIG. 5 illustrates an example wireless sensor network. The network includes a gateway node or base node 100, a number of infrastructure nodes 102, 104, 106, 108, 110, 112, and a number of leaf nodes shown as sensors S. Each sensor associates itself with two infrastructure nodes, such that failure of any one infrastructure node will not entirely disconnect a sensor from the network. In some embodiments, the network takes a form as described in copending U.S. patent application Ser. No. 10/870,295, entitled WIRELESS COMMUNICATION SYSTEM WITH CHANNEL HOPPING AND REDUNDANT CONNECTIVITY, filed Jun. 17, 2004, the disclosure of which is incorporated herein by reference.

In one embodiment, at least some of the sensors operate in low power modes. For example, a given sensor may have an active mode and a low power sleep mode, wherein the sensor periodically wakes from low power sleep to transmit data using the active mode. While in low power sleep, the sensor is unavailable for communications. At a scheduled time, the sensor may awaken, and transmits whatever data it has gathered for transmission to an associated infrastructure node. Next, the infrastructure node transmits the sensor data to the base station.

For the purposes of redundancy, a sensor may transmit to two infrastructure nodes. For example, several sensors 114, 116, 118 are shown associated with each of infrastructure nodes 104, 106. In some embodiments, the system is configured such that routes for signals from these sensors 114, 116, 118 which pass through the infrastructure nodes 104, 106 are non-overlapping. For example, a signal from a first sensor 114 may be routed to infrastructure nodes 104 and 110, and then to the base node 100, and also to infrastructure nodes 106 and, and then to the base node 100. Meanwhile a signal from a second sensor 116 may have the same pair of routes. It can be seen from the system shown that node 102 is likely to be used for a number of sensor transmissions. To reduce the overall latency of the system, some data that could be routed through node 102 may be routed around node 102 to reduce the likelihood of data collisions. Thus, data from a sensor such as sensor 118 may be routed to infrastructure nodes 104 and 110, and then to the base node 100, as well as around node 102 by passing to nodes 106, 108, and 112 before going to the base node 100.

To highlight one of the difficulties that can arise with a decentralized approach to routing, suppose a sensor 120 is added to the system. As can be seen, sensor 120 is placed such that association with nodes 102 and 108 is desirable. Sensor 120 may be close enough for communication with node 106 as well, but is clearly closer to node 102. However, if sensor 120 is the newest sensor added to the system, then node 102 may already be carrying the heaviest routing load of the system. If node 102 is already at its capacity for routing load (such capacity can be predefined for the system), then node 102 would be unavailable for routing signals from sensor 120. This would require sensor 120 to associate with nodes 106 and 108, and would force signals passing from sensor 120 to node 106 to be retransmitted to nodes 104 and 110 before reaching the base node 100. The result is inefficient. However, reconfiguring the entire routing table every time a new sensor is added, every time a sensor is removed, every time a sensor loses communication with its associated infrastructure nodes, and every time a sensor that has lost communication regains communication, as well as other times when infrastructure nodes are added and removed, or lose and regain communication, would likely create a cacophony of routing configuration signals. Therefore, with the present invention, optimal versus actual performance can be compared and measured.

When actual performance falls below a desired threshold, then the system can be reconfigured in either a centralized or decentralized manner. For example, if metrics are generated as explained above with reference to FIG. 4, and if the actual system metric indicates a score which is higher than the idealized score by a predetermined ratio, then the system may be reconfigured. For example, if the ratio of the idealized metric to the actual system metric falls below 75%, then the system may be reconfigured. Other ratios may be used, with higher ratios likely allowing reconfiguration to occur more frequently but also assuring higher efficiency.

Any of the devices in the system may be programmed to perform analysis related to the present invention. Alternatively, a separate device may be communicatively coupled to the system for performing such analysis. If desired, a base station may gather system performance data and transmit the data to another device that is not part of the system (for example, a device accessible using a wired network accessible by the base station). Because an optimized solution may require extra computing capacity, the ability to transmit performance data may aid in allowing system analysis to occur even while the system is operating.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method of analyzing performance of a wireless communication system, the wireless communication system including a base station device and two or more node devices, and operating with an actual communication configuration using communication links between device pairs in the system, the method comprising:

observing wireless communication link characteristics between device pairs in the system;

generating an optimized communication solution globally across two or more device pairs using a centralized configuration routine that references at least some of the observed link characteristics, the optimized communication solution globally defining optimized communication routes between the two or more node devices and the base station device;

calculating a first quality metric based on the optimized communication solution;

observing the actual communication configuration for the node devices and generating a second quality metric using the actual observed communication configuration;

comparing the first quality metric to the second quality metric to determine if a system inefficiency is beyond a predefined level; and if the step of comparing indicates the system inefficiency is beyond a predefined level, reconfiguring the system, but if the step of comparing does not indicates system inefficiency beyond a predefined level, not reconfiguring the system.

2. The method of claim 1 wherein the optimized communication solution is characterized in that, for each node device, first and second or more non-overlapping communication routes to the base station are defined.

3. The method of claim 2 wherein the actual communication configuration also includes first and second or more non-overlapping communication routes to the base station for each node device, at least some communication routes including intermediate nodes between the node device and the base station.

4. The method of claim 3 wherein the first and second quality metrics include a component related to a sum of latencies introduced by each intermediate node in at least some of the communication routes.

5. The method of claim 4, wherein each of the nodes maintains statistics on the residence time of data at that node and uses the mean of the residence time distribution as the latency value.

6. The method of claim 1 wherein the first and second quality metrics include a component related to a number of hops between a first node device and the base station.

7. The method of claim 1 wherein the first and second quality metrics include a component related to the link quality of a link used in a route between a first node device and the base station.

8. The method of claim 1 wherein the optimized communication solution and the actual communication configuration define communication routes having intermediate nodes through which communications pass between a first node device and the base station, wherein the first and second quality metrics include a component related to the number of non-overlapping routes occurring at an intermediate node.

9. The method of claim 1 wherein:
the optimized communication solution is characterized in that, for each node device, first and second non-overlapping communication routes to the base station are defined;
the actual communication configuration also includes first and second non-overlapping communication routes to the base station for each node device, at least some defined communication routes including one or more intermediate nodes between the node device and the base station;
the first and second quality metrics include a component related to a sum of latencies introduced by each intermediate node in at least some communication routes;
the first and second quality metrics include a component related to a number of hops between at least one node device and the base station;
the first and second quality metrics include a component related to the link quality of a link used in a route defined between at least one node device and the base station; and
the first and second quality metrics include a component related to the number of overlapping routes occurring at an intermediate node.

10. A wireless communication system comprising:
at least one base station and at least two node devices configured for wireless communication with one another, wherein the system is configured to have a first routing configuration for routing data between at least one of the node devices and the base station;
at least one analyzing device in or communicatively coupled to the system, the at least one analyzing device is configured to gather data related to actual communication routes defined in the system and to observe an actual quality metric of the system;
the at least one analyzing device is further configured to generate an optimum quality metric based on an optimized global communication solution across all of the at least one base station and the two or more node devices for comparison to the actual quality metric; and
wherein the at least one analyzing device is further configured to compare the optimum quality metric to the actual quality metric, and if the comparison indicates a system inefficiency beyond a predetermined level, causes the system to be reconfigured relative to the first routing configuration, but if the comparison does not indicate a system inefficiency beyond the predetermined level, does not cause the system to be reconfigured relative to the first routing configuration.

11. The system of claim 10 wherein for each node device, first and second or more non-overlapping communication routes to the base station are defined in the optimized global communication solution.

12. The system of claim 11 wherein the actual communication routes include first and second or more non-overlapping communication routes to the base station for each node device, at least some defined communication routes including intermediate nodes between the node device and the base station.

13. The system of claim 12 wherein the actual and optimum quality metrics include a component related to a sum of latencies introduced by each intermediate node in at least some defined communication routes.

14. The system of claim 10 wherein the actual and optimum quality metrics include a component related to a number of hops between a first node device and the base station in at least some defined communication routes.

15. The system of claim 10 wherein the actual and optimum quality metrics include a component related to the link quality of a link used in a route defined between a first node device and the base station in at least some defined communication routes.

16. The system of claim 10 wherein:
a number of optimal communication routes are defined when the optimal quality metric is generated, at least one optimal communication route having an intermediate node conveying data from a first node to the base station;
at least one actual communication route includes an intermediate node; and
the actual and optimum quality metrics include a component related to the number of overlapping routes occurring at an intermediate node.

17. The system of claim 10 wherein:
for each node device, first and second or more non-overlapping communication routes to the base station are defined when the optimum quality metric is generated;
the actual communication routes include first and second non-overlapping communication routes to the base station for each node device, at least some defined communication routes including intermediate nodes between the node device and the base station;
the actual and optimum quality metrics include a component related to a sum of latencies introduced by each intermediate node in at least some defined communication routes;
the actual and optimum quality metrics include a component related to a number of hops between a first node device and the base station;
the actual and optimum quality metrics include a component related to the link quality of a link used in a route defined between a first node device and the base station; and
the actual and optimum quality metrics include a component related to the number of overlapping routes occurring at an intermediate node.

18. A wireless communication system comprising:
at least one base station, a number of infrastructure node devices configured for wireless communication with one another, and a number of leaf devices that communicate with the infrastructure node devices, wherein the system is configured to have a first routing configuration for routing data between at least one of the leaf devices and at least one of the base stations;
at least one analyzing device in or communicatively coupled to the system, the at least one analyzing device is configured to gather data related to actual communication routes defined in the system and to observe an actual quality metric of the system;

wherein the at least one analyzing device is further configured to generate an optimum global quality metric across all of the at least one base station, the number of infrastructure node devices and the number of leaf devices by constructing an optimized communication configuration using the data related to actual communication routes; and wherein the at least one analyzing device is further configured to compare the optimum quality metric to the actual quality metric, and if the comparison indicates a system inefficiency beyond a predetermined level, causes the system to be reconfigured into a new routing configuration that is different from the first routing configuration, but if the comparison does not indicate a system inefficiency beyond a predetermined level, does not cause the system to be reconfigured to a new routing configuration.

19. The system of claim 18 wherein the leaf devices comprise sensors having a sleep mode and an active mode, the sensors being configured to awaken at scheduled times and transmit data to one or more of the infrastructure node devices, each sensor being associated with at least two infrastructure node devices.

20. The system of claim 18 wherein the system is configured such that first and second or more non-overlapping routes are defined from each leaf node to base station.

21. A method of maintaining the performance of a wireless communication system, the wireless communication system including a base station device and two or more node devices, the method comprising:

(a) generating an optimized communication solution globally across two or more device pairs using a centralized configuration routine, the optimized communication solution globally defining optimized communication routes between two or more node devices and the base station device;

(b) configuring the wireless communication system in accordance with the optimized communication solution;

(c) over time, changing the optimized communication solution to accommodate changes to the wireless communication system;

(d) monitoring one or more performance characteristics of the wireless communication system, and when the one or more performance characteristics of the wireless communication system deviate from one or more performance characteristics of an optimized communication solution by an amount, generating another optimized communication solution using a centralized configuration routine and reconfiguring the wireless communication system in accordance with the another optimized communication solution; and repeating steps (c)-(d).

* * * * *

UNITED STATES PATENT AND TRADEMARK OFFICE
CERTIFICATE OF CORRECTION

| | | |
|---|---|---|
| PATENT NO. | : 7,826,373 B2 | Page 1 of 1 |
| APPLICATION NO. | : 10/905971 | |
| DATED | : November 2, 2010 | |
| INVENTOR(S) | : Kolavennu et al. | |

It is certified that error appears in the above-identified patent and that said Letters Patent is hereby corrected as shown below:

On the title page:
Please delete "This patent is subject to a terminal disclaimer".

Signed and Sealed this
Fourth Day of January, 2011

David J. Kappos
*Director of the United States Patent and Trademark Office*